US011991549B2

(12) United States Patent
Kim et al.

(10) Patent No.: US 11,991,549 B2
(45) Date of Patent: May 21, 2024

(54) FAST CELL SETUP FOR DUAL CONNECTIVITY

(71) Applicant: LG ELECTRONICS INC., Seoul (KR)

(72) Inventors: Taehun Kim, Seoul (KR); Jongwoo Hong, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 407 days.

(21) Appl. No.: 17/420,989

(22) PCT Filed: Dec. 30, 2019

(86) PCT No.: PCT/KR2019/018719
§ 371 (c)(1),
(2) Date: Jul. 6, 2021

(87) PCT Pub. No.: WO2020/197054
PCT Pub. Date: Oct. 1, 2020

(65) Prior Publication Data
US 2022/0086670 A1    Mar. 17, 2022

Related U.S. Application Data

(60) Provisional application No. 62/823,568, filed on Mar. 25, 2019, provisional application No. 62/822,075, filed on Mar. 22, 2019.

(30) Foreign Application Priority Data

Jun. 28, 2019   (KR) .......................... 10-2019-0078267

(51) Int. Cl.
*H04W 24/10*   (2009.01)
*H04W 68/00*   (2009.01)
(Continued)

(52) U.S. Cl.
CPC ......... *H04W 24/10* (2013.01); *H04W 68/005* (2013.01); *H04W 76/15* (2018.02); *H04W 76/20* (2018.02); *H04W 76/30* (2018.02)

(58) Field of Classification Search
CPC ... H04W 24/10; H04W 68/005; H04W 76/20; H04W 76/30; H04W 76/18; H04W 76/27
See application file for complete search history.

(56) References Cited

U.S. PATENT DOCUMENTS

2010/0279679 A1 * 11/2010 Young ............... H04W 36/0085
455/423
2015/0249950 A1    9/2015 Teyeb et al.
(Continued)

OTHER PUBLICATIONS

PCT International Application No. PCT/KR2019/018719, International Search Report dated Apr. 8, 2020, 2 pages.
(Continued)

*Primary Examiner* — Jianye Wu
(74) *Attorney, Agent, or Firm* — LEE, HONG, DEGERMAN, KANG & WAIMEY

(57) ABSTRACT

Provided are a method for fast cell setup. According to an embodiment of the present disclosure, the method includes receiving a cell group configuration including a list of cells, performing measurement on the cells, identifying at least one invalid cell among the cells included in the cell group configuration based on a result of the measurement, reporting information on the identified invalid cell.

11 Claims, 15 Drawing Sheets

(51) Int. Cl.
     *H04W 76/15*     (2018.01)
     *H04W 76/20*     (2018.01)
     *H04W 76/30*     (2018.01)

(56) References Cited

U.S. PATENT DOCUMENTS

| | | | | |
|---|---|---|---|---|
| 2016/0309461 | A1* | 10/2016 | Yin | H04L 5/00 |
| 2018/0192445 | A1 | 7/2018 | Jiang | |
| 2019/0356536 | A1* | 11/2019 | Lee | H04L 41/0654 |
| 2021/0392537 | A1* | 12/2021 | Da Silva | H04W 76/25 |
| 2022/0061113 | A1* | 2/2022 | Kim | H04L 5/0098 |

OTHER PUBLICATIONS

3GPP, "TSG RAN; Evolved Universal Terrestrial Radio Access (E-UTRA); Radio Resource Control (RRC); Protocol specification (Release 15)," 3GPP TS 36.331 V15.4.0, Feb. 2019, pp. 78, 99, 154, 238-239.

* cited by examiner though to US 11,991,549 B2

FAST CELL SETUP FOR DUAL CONNECTIVITY

CROSS-REFERENCE TO RELATED APPLICATIONS

This application is the National Stage filing under 35 U.S.C. 371 of International Application No. PCT/KR2019/018719, filed on Dec. 30, 2019, which claims the benefit of U.S. Provisional Patent Application Nos. 62/822,075, filed on Mar. 22, 2019 and 62/823,568, filed on Mar. 25, 2019, and also claims the benefit of earlier filing date and right of priority to Korean Patent Application No. 10-2019-0078267, filed on Jun. 28, 2019, the contents of which are all incorporated by reference herein in their entirety.

TECHNICAL FIELD

The present disclosure relates to dual connectivity.

BACKGROUND

Efforts have been made to develop an improved 5th-generation (5G) communication system or a pre-5G communication system in order to satisfy a growing demand on radio data traffic after commercialization of a 4th-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

SUMMARY

In the prior art, there are some discussion to support fast cell setup for MR-DC. It is argued that SCG lower layer configuration is kept when the UE initiate resume procedure, i.e. until the UE receive resume message including SCG configuration from the network.

The problem of the prior art is that when the network direct UE to add/modify/resume SCell(s) by providing new SCell configuration or commending to resume some of all SCell(s) in the stored SCell configuration, the SCell addition or SN(Secondary Node) addition by (re-)configuration or resume can be failed because the network doesn't know which cell(s) is valid in the UE at that time. Valid cell(s) in the UE can be vary over time (e.g. due to UE mobility) while all cells in the SCG configuration are valid in the moment the UE transit state from RRC connected mode to RRC inactive mode.

According to an embodiment of the present disclosure, a method performed by a wireless device in a wireless communication system is provided. The method may comprise receiving a cell group configuration including a list of cells, performing measurement on the cells, identifying at least one invalid cell among the cells included in the cell group configuration based on a result of the measurement, reporting information on the identified invalid cell.

The present disclosure can have various advantageous effects.

For example, a UE may perform efficient handling of radio bearer(s) associated to invalid SCell(s). In specific, fast cell setup may be achieved by excluding the invalid cells during the DC setup.

For example, it may be beneficial to prevent unnecessary triggering of procedure such as synchronization, Random access and transmission due to trial of transmission or reception via radio bearer(s) associated to invalid SCell(s).

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
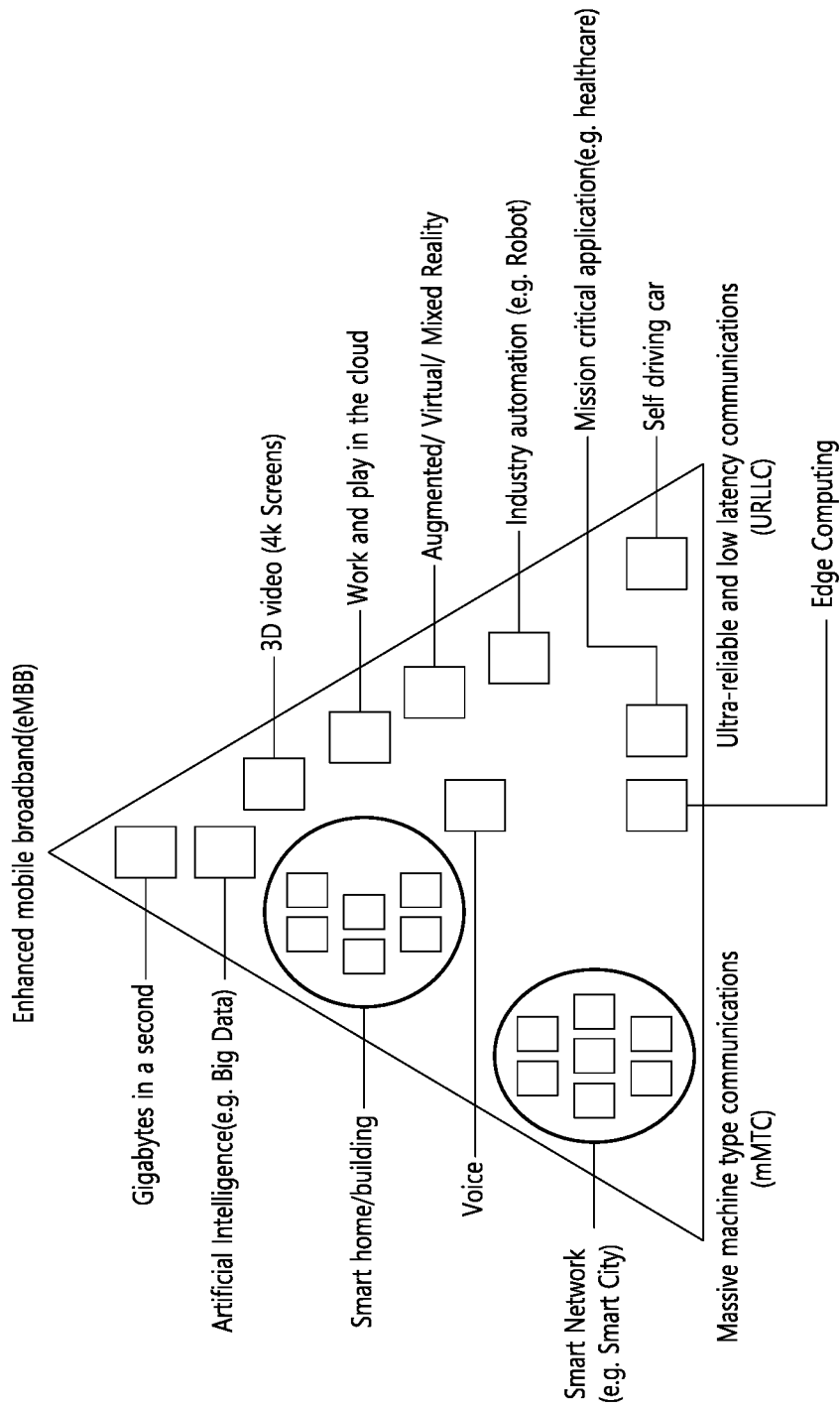
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "AB/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g.

devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
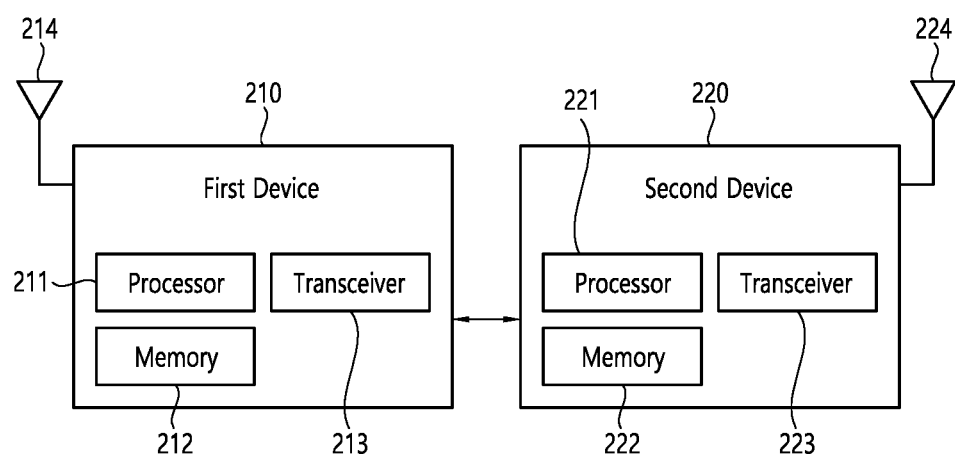
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present disclosure described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present disclosure described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
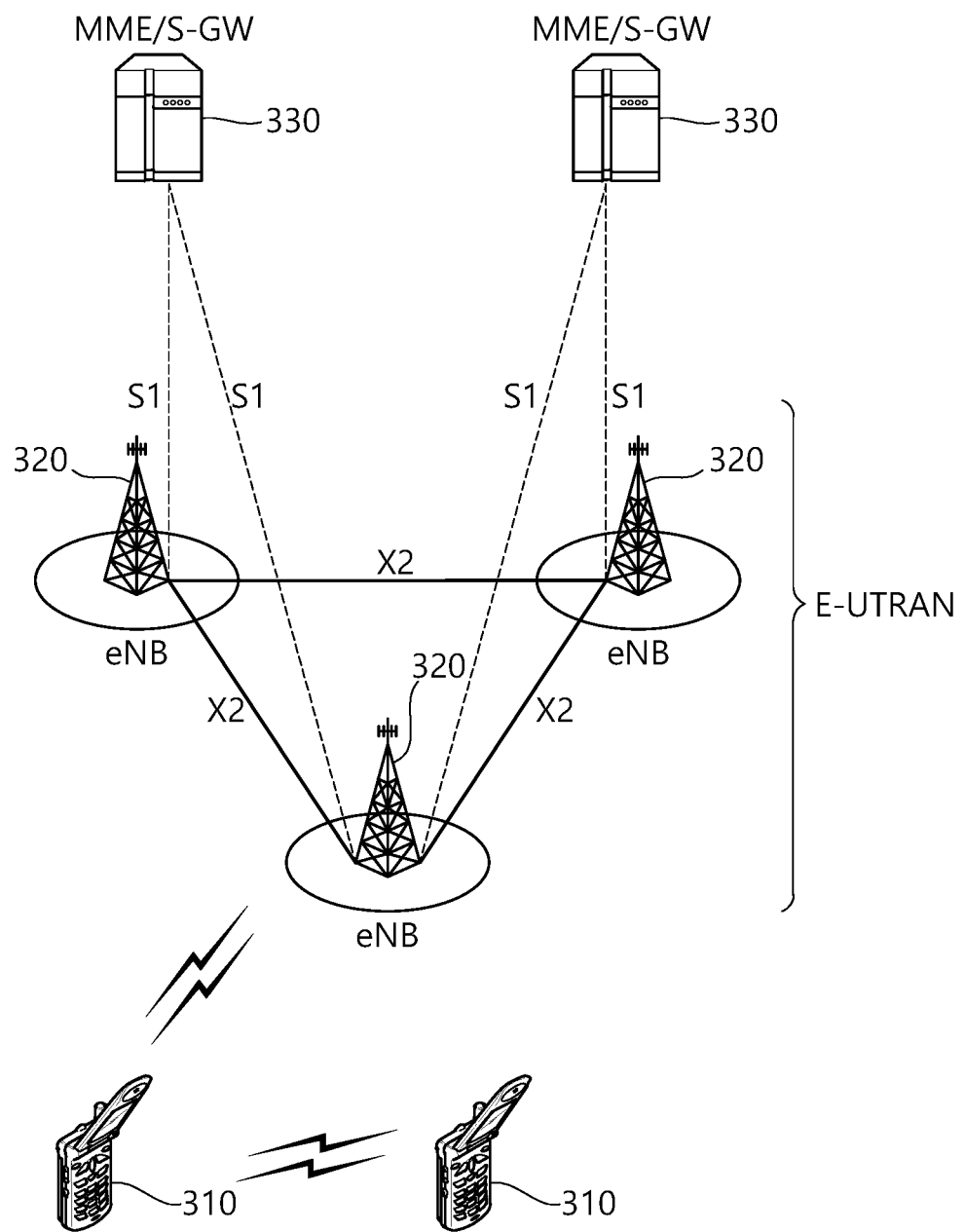
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNB s.

Figure 4:
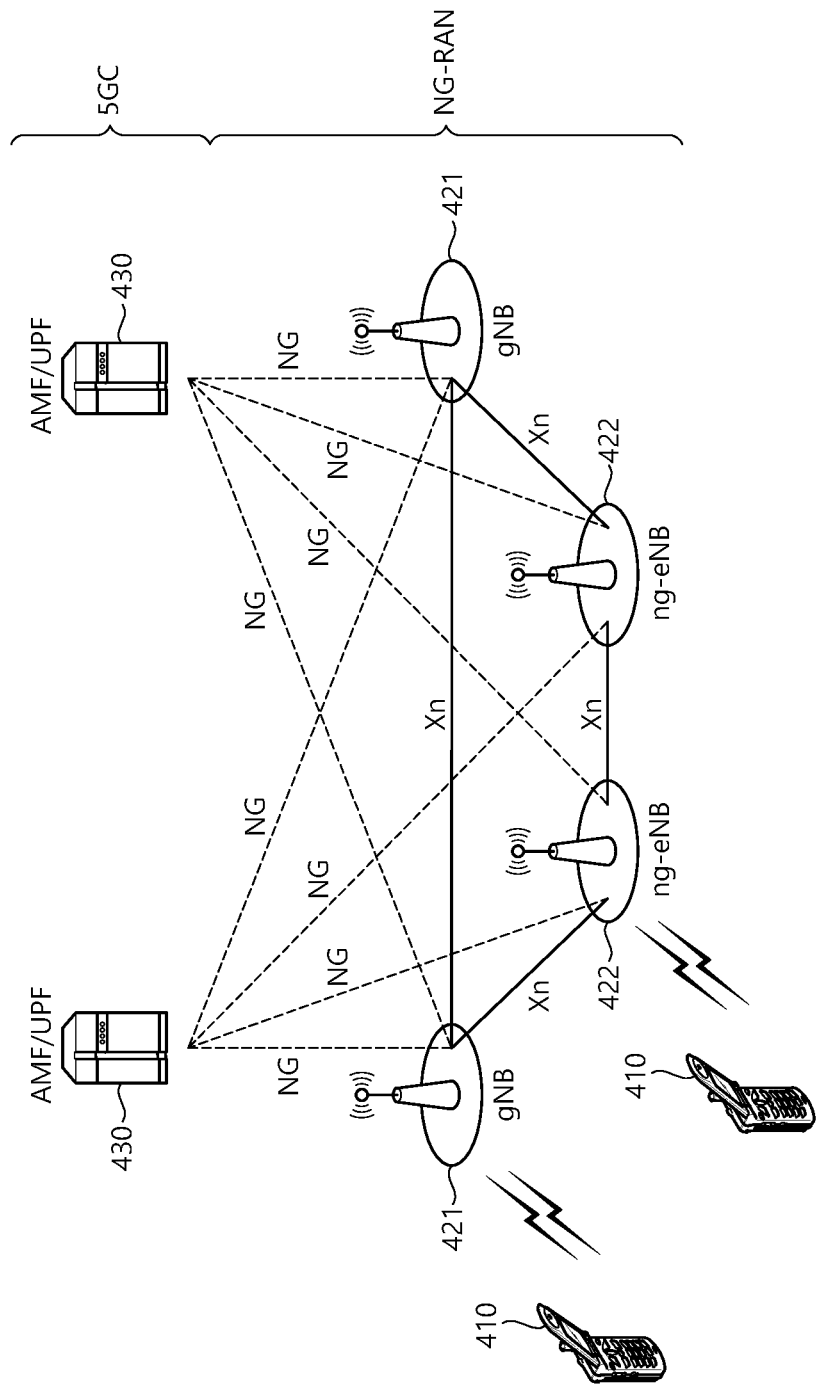
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
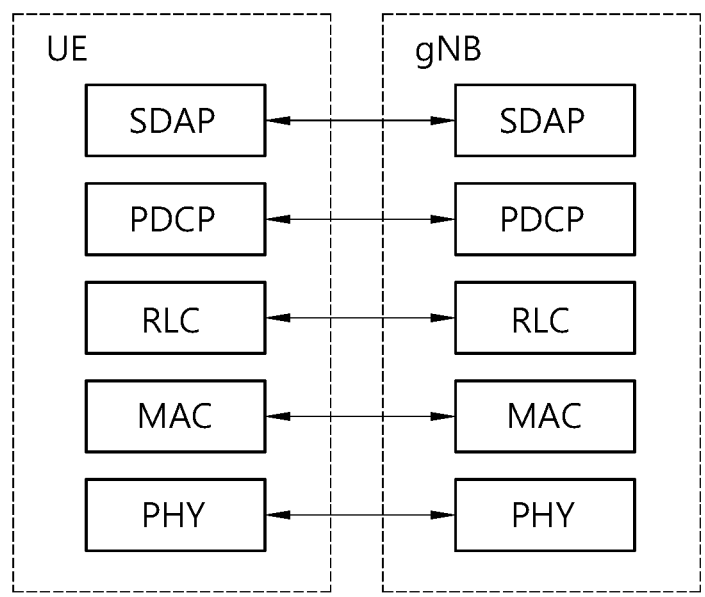
FIG. 5 shows a block diagram of a user plane protocol stack to which the technical features of the present disclosure can be applied.
Figure 6:
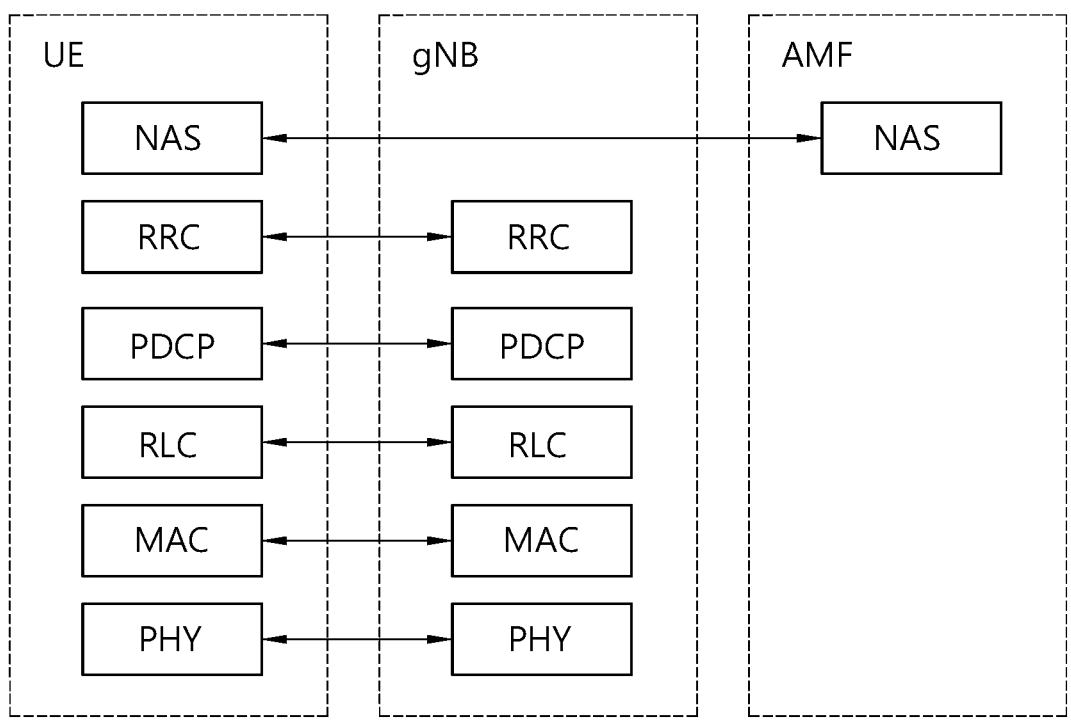
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N_{sizeBWP,i}-1$, where i is the number of the bandwidth part. The relation between the physical resource block nPRB in the bandwidth part i and the common resource block nCRB is as follows: $nPRB=nCRB+N_{sizeBWP,i}$, where $N_{sizeBWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. A SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 7:
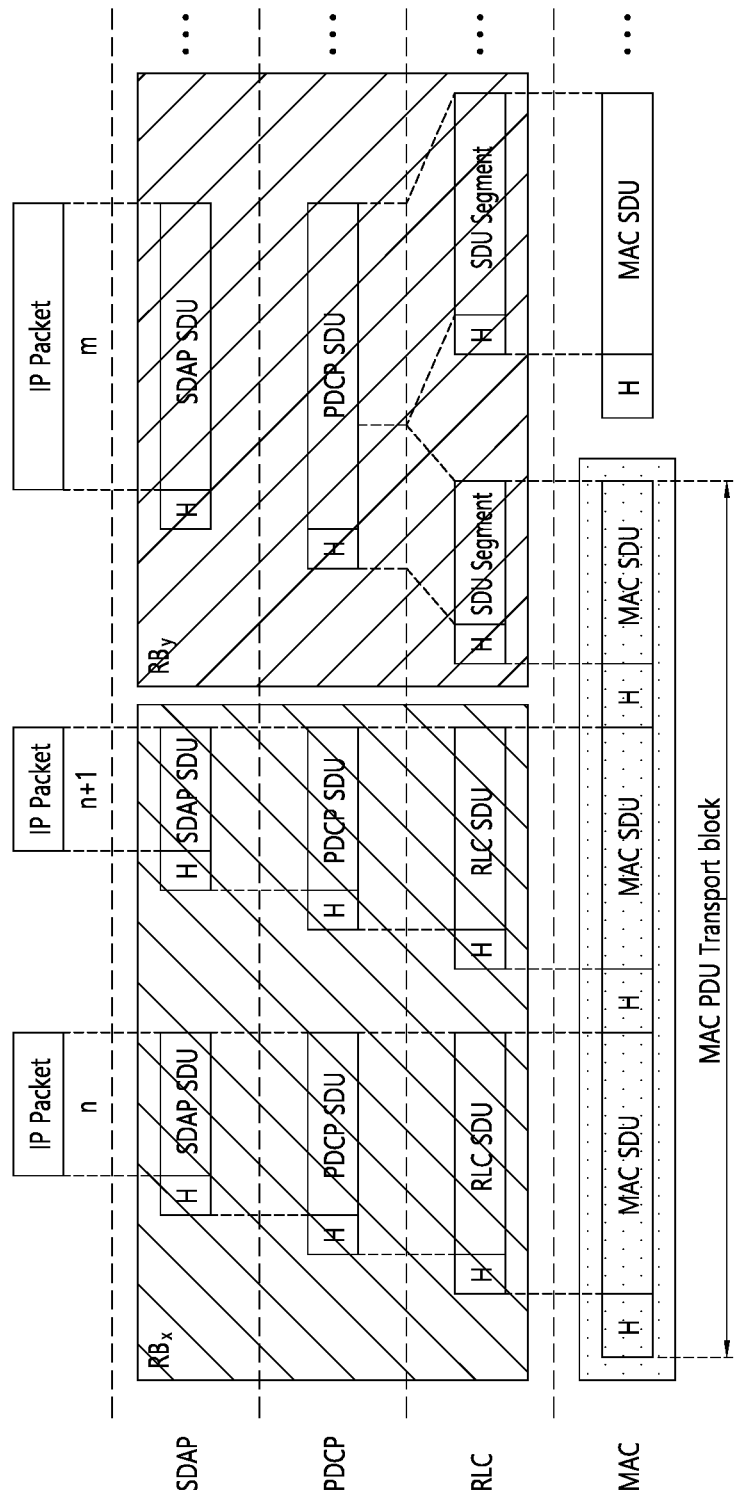
FIG. 7 illustrates a data flow example in the 3GPP NR system.

FIG. 7 illustrates a data flow example in the 3GPP NR system.

In FIG. 7, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

In the prior art, the UE may be configured to perform failure information procedure to report RLC failure of type duplication and (NR) SCG failure information to report SCG radio link failure.

According to the prior art, some examples of failure information procedure and SCG failure information may be performed as follows.

In case of DC, the UE shall:
1> upon T313 expiry; or
1> upon random access problem indication from SCG MAC; or
1> upon indication from SCG RLC, which is allowed to be sent on PSCell, that the maximum number of retransmissions has been reached for an SCG or split DRB:
2> consider radio link failure to be detected for the SCG i.e. SCG-RLF;
2> initiate the SCG failure information procedure to report SCG radio link failure;
In case of CA PDCP duplication, the UE shall:
1> upon indication from an RLC entity, which is restricted to be sent on SCell only, that the maximum number of retransmissions has been reached:
2> initiate the failure information procedure to report RLC failure of type duplication;

In the priori art, the UE performs IDLE mode measurement in RRC_IDLE but it can be applied in RRC inactive mode. Then, the UE perform measurement for SCell(s) in RRC inactive mode and identify whether SCell is valid or not based on measurements.

In the prior art, there are some discussion to support fast cell setup for MR-DC. It is argued that SCG lower layer configuration is kept when the UE initiate resume procedure, i.e. until the UE receive resume message including SCG configuration from the network.

The problem of the prior art is that when the network direct UE to add/modify/resume SCell(s) by providing new SCell configuration or commending to resume some of all SCell(s) in the stored SCell configuration, the SCell addition or SN(Secondary Node) addition by (re-)configuration or resume can be failed because the network doesn't know which cell(s) is valid in the UE at that time. Valid cell(s) in the UE can be vary over time (e.g. due to UE mobility) while all cells in the SCG configuration are valid in the moment the UE transit state from RRC connected mode to RRC inactive mode.

According to the prior art, regardless of whether the cells which the network direct UE to add/modify/resume is valid or not, the UE shall perform the direction of the network. However, the direction for the invalid cell(s) is failed. The failure can be happen in middle of 'synchronization' or 'RA procedure' or 'UL transmission'. For example about 'synchronization', the UE receives "out-of-sync" indications from physical layer and then, trigger failure information procedure or SCG failure information procedure. But, it takes some time until the UE receives "out-of-sync" indications from physical layer. The latency for cell setup will increase according to the prior art.

In this disclosure, it may be assumed that UE keeps SCG lower layer configuration when the UE initiate resume procedure. In specific, the SCG lower layer configuration may consist of PSCell configuration and SCell configuration. The UE may keep only PSCell configuration, or keep all configuration of PSCell configuration and SCell configuration. The UE may keep configuration of some SCells but not keep one of some SCells. The configuration will be kept may be determined or (pre)configured by the network. The information for which configuration will be kept may be provided to the UE in RRC (connection) release message when the network make the UE in RRC connected mode to RRC inactive mode.

In this disclosure, a UE in inactive condition is at least a UE in RRC_INACTIVE in NR, in lightweight connection in LTE, suspended stated, or in RRC_INACTIVE or lightweight connection in eLTE. A RAN node is at least gNB in NR, eNB in LTE or eNB in eLTE. In addition, the MN and SN configured with DC have at least combination of NR and NR, E-UTRAN and E-UTRAN, NR and E-UTRAN or E-UTRAN and NR.

Further, it may be assumed that UE keeps MCG SCell configuration when the UE initiate resume procedure. In specific, the UE may keep configuration of either all SCells or some SCells in MCG configuration. The configuration will be kept may be determined or (pre)configured by the network. The information for which configuration will be kept may be provided to the UE in RRC (connection) release message when the network make the UE in RRC connected mode to RRC inactive mode. The network may perform MCG SCell and/or SCG configuration either blindly or based on information from the UE.

In this disclosure, a selective resumption of DC configuration may be one of the following types:
  Type A: A resumption of the entire DC configuration
  Type B: A resumption of the MCG configuration (selective resuming of entire MCG configuration and/or selective resuming for each SCells in the MCG)
  Type C: A resumption of the SCG configuration (selective resuming of entire SCG configuration and/or selective resuming for each cells in the SCG)

To support above selective resumption of DC configuration while in inactive condition, the UE may receive a specific criteria from the network for validity check of each DC configuration, e.g., the entire DC configuration, the entire or respective Scells in MCG or the entire or respective cells in SCG. In other words, if the specific criteria are met described below, the UE may consider each DC configuration valid. A specific criteria are as follows.
  Option 1) The RAN node provides validity area information in which the each DC configuration is considered valid. The validity area information consists of a cell or a list of cells. Additionally, for each DC configuration, the associated validity area information is provided. The examples of validity area information associated with each DC configuration are as follows.
    A cell or a list of cells in which the entire DC configuration is valid
    A cell or a list of cells in which the entire MCG configuration is valid
    A cell or a list of cells in which the each SCells in the MCG is valid
    A cell or a list of cells in which the entire SCG configuration is valid
    A cell or a list of cells in which the each cells in the SCG is valid
  Option 2) The RAN node may provide a specific RSRP threshold with which each DC configuration is considered valid. If each cell of DC configuration is greater than or equal to the threshold value, the cell may be considered to be valid. Optionally, the threshold value may be provided for each DC configuration so that different threshold value is applied to different cell/cell group. The examples of relation between the threshold values and each DC configuration may be as follows.
    The RSRP threshold for validation of the entire MCG configuration. In this case, only if the cell quality of all the cells in MCG is greater than or equal to the threshold, the UE considers the MCG configuration valid.
    The RSRP threshold per cell for validation of the each SCells in the MCG.
    The RSRP threshold for validation of the entire SCG configuration. In this case, only if the cell quality of all the cells in SCG is greater than or equal to the threshold, the UE considers the SCG configuration valid.
    The RSRP threshold per cell for validation of the each cells in the SCG.
  Option 2) The RAN node may provide a validity time duration in which the each DC configuration is considered valid. Optionally, the validity time and associated DC configuration may be provided. The examples of relation between the validity time and associated DC configuration may be shown below.
    Time duration during which the entire DC configuration is valid
    Time duration during which the entire MCG configuration is valid
    Time duration during which the entire SCG configuration is valid
    Timer duration during which cell is valid in each DC configuration
    The RAN node provide validity timer value to calculate the validity time duration.

Regarding the validity time duration, the UE may set validity timer with provided the validity timer value to check validity of each DC configuration. The UE may start the validity timer when entering into RRC inactive mode. If the validity timer is expired, the UE may consider corresponding configuration or cell is invalid.

The UE receives above criteria via a dedicated signaling or broadcast signaling. When the UE configured with DC receives the command for state transition to inactive condition, the UE receives the criteria via dedicated signaling. While in inactive condition, the UE receives the criteria via broadcast e.g. system information message.

If the UE does not receive a specific criteria, the UE may use the received Cell Reselection Criteria used for reselection while in RRC_IDLE. According to the Cell Reselection Criteria, the UE may perform cell reselection. If the UE is camped on the cell of the DC configuration, the UE may consider the cell is valid. The UE may perform validity check for TA (Timing Advance), that is, whether Timing Advance is valid or not. The UE may consider that TA for the cell is not valid, when the timeAlignmentTimer associated with the TAG to which this (Serving) Cell belongs is not running; or the timeAlignmentTimer associated with the TAG to which this (Serving) Cell belongs is expired; or It is assumed the timeAlignmentTimer is running in RRC inactive If the each DC configuration meets the criteria provided by the network, if any, the UE may include an indicator of whether the each DC configuration is valid based on a criteria in the message used for RRC connection activation.

If the each DC configuration does not meet the criteria provided by the network, if any, the UE may include an indicator of whether the each DC configuration is not valid based on a criteria in the message used for RRC connection activation.

If the each DC configuration does not meet the criteria provided by the network, if any, the UE may release the each DC configuration that does not meet the criteria, and include an indicator of whether the each DC configuration is deleted or not in the message used for RRC connection activation. The deleted cells/cell group or kept cells/cell group is provided to the network.

The RAN node that received the message from the UE may perform SN release or SN modification procedure based on an indicator.

Meanwhile, Data unit(s) (e.g. PDCP SDU, PDCP PDU, RLC SDU, RLC PDU, RLC SDU, MAC SDU, MAC CE, MAC PDU) in the present disclosure may be transmitted/received on a physical channel (e.g. PDSCH, PUSCH) based on resource allocation (e.g. UL grant, DL assignment). In the present disclosure, uplink resource allocation may be also referred to as uplink grant, and downlink resource allocation is also referred to as downlink assignment. The resource allocation may include time domain resource allocation and frequency domain resource allocation. In the present disclosure, an uplink grant may be either received by the UE dynamically on PDCCH, in a Random Access Response, or configured to the UE semi-persistently by RRC. In the present disclosure, downlink assignment may be either received by the UE dynamically on the PDCCH, or configured to the UE semi-persistently by RRC signaling from the BS.

Figure 8:
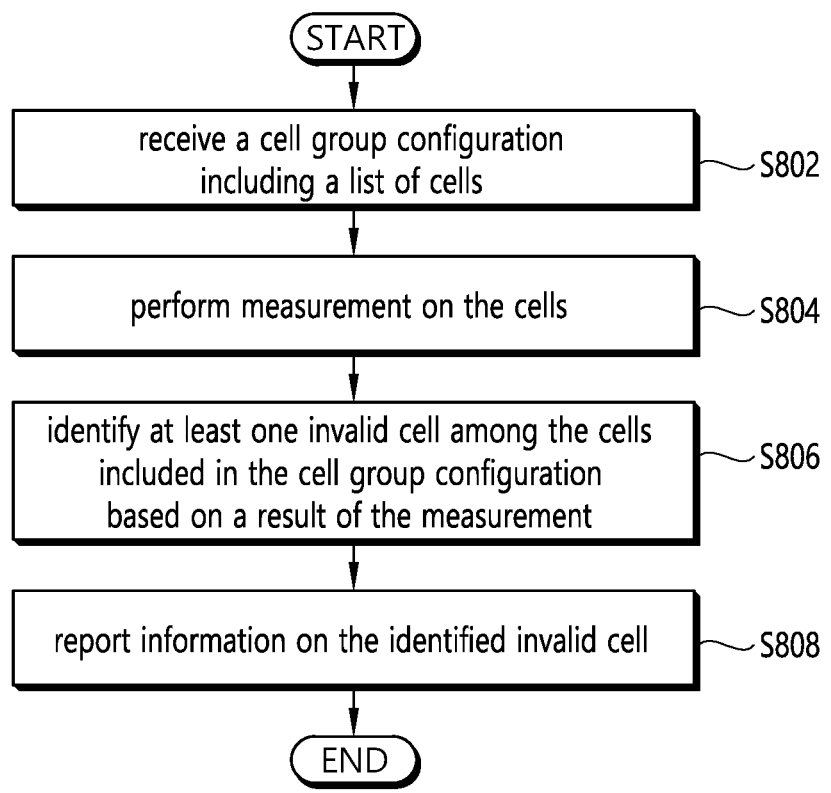
FIG. 8 shows a method for fast failure reporting according to an embodiment of the present disclosure.

FIG. 8 shows a method for fast failure reporting according to an embodiment of the present disclosure. A wireless device may communicate with at least one of a mobile terminal, a network or autonomous vehicles other than the wireless device.

In step S802, the wireless device may receive a cell group configuration including a list of cells. The cell group configuration may further include a measurement configuration for the measurement In step S804, the wireless device may perform measurement on the cells. The measurement may be performed while the wireless device is in radio resource control (RRC) inactive state or a RRC idle state.

In step S806, the wireless device may identify at least one invalid cell among the cells included in the cell group configuration based on at least one of a result of the measurement. The invalid cells may be identified based on a channel quality, a predefined validity area, timing advance (TA), or validity timer.

Further, the wireless device may be further configured to suspend a radio bearer which is related to the identified invalid cell. The suspending the radio bearer may be performed when all cells related to the radio bearer are invalid. In this case, the all cells related to the radio bearer may be a secondary cell (SCell). Meanwhile, the suspending the radio bearer may be performed when at least one cell related to the radio bearer is invalid. In this case, the at least one cell related to the radio bearer may be a primary secondary cell (PSCell)

In step S808, the wireless device may report information on the identified invalid cell. The information on the identified invalid cell may include information of the suspended radio bearer.

According to embodiments of the present disclosure, a UE may perform fast failure reporting for invalid SCell(s) as soon as identifying invalid SCell(s) without waiting of existing failure triggering. Further, the network may perform fast cell setup for CA and DC configuration by reducing latency for failure reporting including update SCell information.

According to an embodiment of the present disclosure, a UE may perform IDLE mode measurement in RRC inactive mode or RRC_IDLE mode. If the UE receives message including SCell configuration and/or indication to resume all or some SCell(s) in the stored SCell configuration from the network, the UE may comply the message, but the UE may identify all or some SCell(s) in the SCell configuration or the stored SCell configuration is (or are) invalid. Then, the UE may immediately perform/initiate procedure to inform the network of the failure reason. The failure reason may be that SCell(s) is invalid where the procedure can be either failure information procedure or SCG failure information procedure depending on failure reason, or new procedure. The list of the invalid SCell(s) and valid SCell(s) may be included in the message. Upon receiving them, the network may determine new SCell(s) among the valid SCell(s) and provides message including new SCell configuration and/or IE to resume SCell(s) in the stored SCell configuration based on the determined new SCell(s) to the UE.

Figure 9:
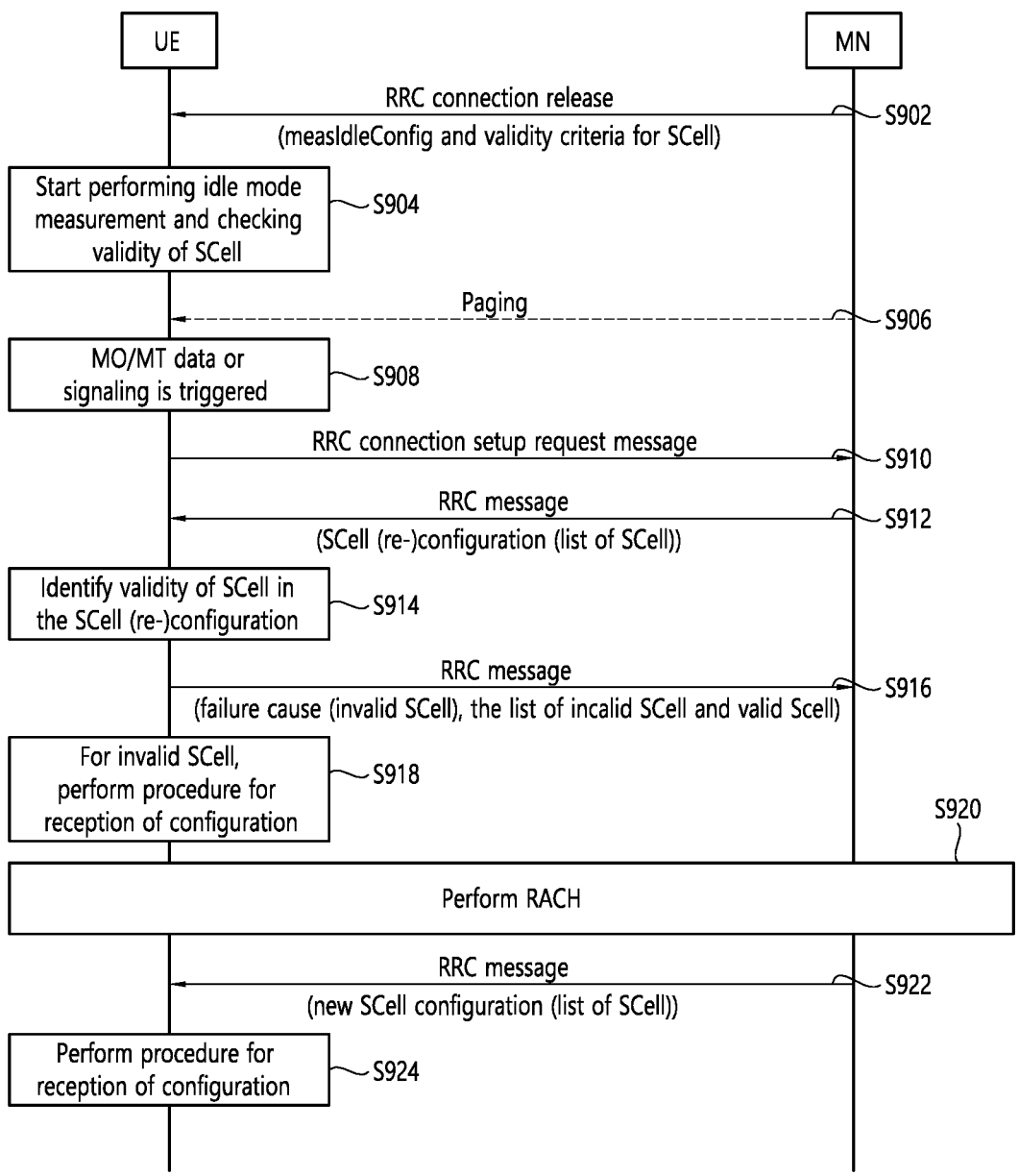
FIG. 9 shows a method for the fast failure reporting for invalid SCell(s) in RRC IDLE mode according to an embodiment of the present disclosure.

FIG. 9 shows a method for the fast failure reporting for invalid SCell(s) in RRC IDLE mode according to an embodiment of the present disclosure. In this embodiment, a UE may be not only a terminal device, but also any types of device operating as wireless device, for example, an integrated access backhaul (IAB) node. Therefore, a UE may be referred as a wireless device. In this embodiment, a network may be at least one of base station (BS), gNodeB (gNB) or eNodeB (eNB). In this embodiment, it may be assumed that the UE supports dual connectivity with a master node (MN) and a secondary node (SN). The MN may be a MgNB or MeNB, and the SN may be a SgNB or SeNB.

In step S902, the network may transmit configuration for idle state measurement (measIdleConfig) and validity criteria for SCell(s) to the UE. The validity criteria may be provided by the network via system information or dedicated signaling. The dedicated signaling may be a RRC release message. When the UE receives the RRC release message, the UE may enter into RRC inactive mode.

The valid cell may be a cell which satisfies at least one condition that RSRP or RSRQ of the cell is greater than certain threshold and/or that validity timer is running; and/or that the cell is belong to validity area; and/or that TA of the cell is valid.

In step S904, upon receiving the measIdleConfig and validity criteria for SCell(s) via the RRC release message, the UE may start performing IDLE mode measurement and checking validity of SCell(s) with the validity criteria. The list of SCell(s) of which the UE check validity can be provided by the network via system information or dedicated signalling (e.g. RRC release message).

In step S906, the UE may receive paging message from the network, while in RRC inactive state.

In step S908, the UE may detect mobile originated (MO) or mobile terminated (MT) data or signaling is triggered.

In step S910, when MO/MT data or signaling is triggered, the UE may perform RRC connection establishment procedure. In specific, the UE may transmit a RRC setup request message to the network.

In step S912, the network may provide message including (re-)configuration for SCell(s). The (re-)configuration for SCell may include configuration for SCell and/or PSCell. In specific, the message may include radio bearer configuration (e.g. for SRB or DRB addition). Further, the message may include RACH information. The RACH information may indicate whether the UE perform RACH procedure toward the determine PSCell and/or SCell. The RACH information may request RACH resource and/or configuration for the determine PSCell and/or SCell the list of valid cell which not belong to the determined PSCell and the list of determined SCell(s). The UE may perform RACH procedure toward the determine PSCell and/or SCell if TA of PSCell and/or SCell is not valid.

In step S914, if the UE is able to comply the message, the UE may check validity of SCell(s) associated to the SCell (re-)configuration based on validity criteria and identity valid SCell(s) and invalid SCell(s) among the SCell(s) associated to the SCell (re-)configuration. Otherwise, the UE perform the actions upon leaving RRC_CONNECTED or re-establishment procedure specified in TS 36.331 or TS 38.331.

In step S916, if there is invalid SCell(s), for invalid SCell(s), the UE may initiate procedure to inform the network that the UE is able to comply message but not able to apply (re-) configuration because SCell is invalid. When performing the procedure, the UE may send message to the network where the message includes failure reason/cause (e.g. invalid SCell or invalid PSCell) and the list of invalid SCell(s) in the (re-)configuration. The message may also include the list of valid SCell(s). The procedure may be new procedure or existing procedures. The procedure may be either failure information procedure or SCG failure information. If the invalid SCell is PSCell, the SCG failure information may be used. Otherwise, failure information may be used.

Also, existing failure cause/type can be reused. For example, for SCG failure, existing failure causes/types such as synchReconfigFailure-SCG, randomAccessProblem, rlc-MaxNumRetx, scg-reconfigFailure may be used. For re-using failure cause/type, the UE may determine which cause among existing cause will be used for this failure due to invalid SCell. Interaction between RRC layer and lower layers may be made as follows:

- For rlc-MaxNumRetx, RRC layer may request RLC layer to trigger rlc-MaxNumRetx event and provide the indication for it to RRC layer. Upon receiving it, RRC layer may perform corresponding procedure specified in TS 36.331 or TS 38.331.
- For randomAccessProblem, RRC layer may request MAC layer to trigger randomAccessProblem event and provide the indication for it to RRC layer. Upon receiving it, RRC layer may perform corresponding procedure specified in 3GPP TS 36.331 or TS 38.331.
- For T310 expiry, RRC layer may request physical layer to trigger "out-of-sync" event and provide the indication for it to RRC layer. Upon receiving it, RRC layer may consider T310 is expired and perform corresponding procedure specified in TS 36.331 or TS 38.331.

In step S918, for valid SCell(s), the UE may perform procedure corresponding to reception of (re-)configuration (e.g. SCell addition or PSCell addition).

In step S920, the UE may perform synchronization and RA procedure toward valid SCell(s) if necessary.

In step S922, upon the message, the network may determine new SCell(s) (e.g. new PSCell and/or SCell) and send message including new (re-)configuration for determined new SCell(s) to the UE.

In step S924, upon the message, the UE may perform procedure corresponding to reception of (re-)configuration (e.g. SCell addition or PSCell addition) and perform RA procedure toward valid SCell(s) if necessary.

According to embodiments of the present disclosure, a UE may perform fast failure reporting for invalid SCell(s) as soon as identifying invalid SCell(s) without waiting of existing failure triggering. Further, the network may perform fast cell setup for CA and DC configuration by reducing latency for failure reporting including update SCell information. That is, a fast cell setup may be achieved by excluding the invalid cells during the DC setup.

Figure 10:
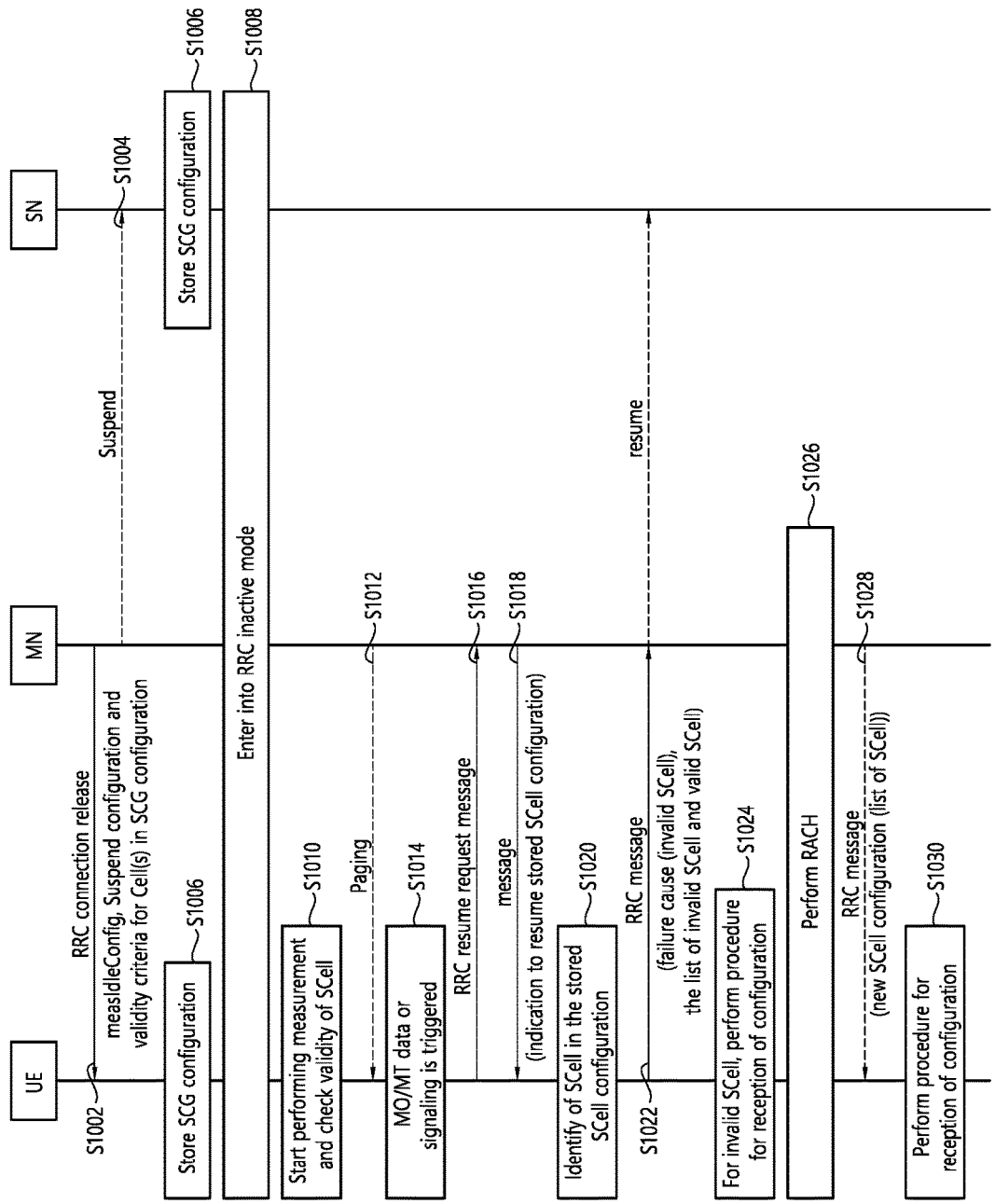
FIG. 10 shows a method for the fast failure reporting for invalid SCell(s) in RRC IDLE mode according to an embodiment of the present disclosure.

FIG. 10 shows a method for the fast failure reporting for invalid SCell(s) in RRC IDLE mode according to an embodiment of the present disclosure. In this embodiment, a UE may be not only a terminal device, but also any types of device operating as wireless device, for example, an integrated access backhaul (IAB) node. Therefore, a UE may be referred as a wireless device. In this embodiment, a network may be at least one of base station (BS), gNodeB (gNB) or eNodeB (eNB). In this embodiment, it may be assumed that the UE supports dual connectivity with a master node (MN) and a secondary node (SN). The MN may be a MgNB or MeNB, and the SN may be a SgNB or SeNB.

In step S1002, the MN may transmit a RRC connection release message to the UE with a suspend configuration. The RRC release message may include measIdleConfig and validity criteria for SCell(s). The validity criteria may be provided by the network via system information or dedicated signalling (e.g. RRC release message). The valid cell may be a cell satisfying the following information.

If RSRP or RSRQ of the cell is greater than certain threshold; and/or
If validity timer is running; and/or
If the cell is belong to validity area; and/or
If TA of the cell is valid The MCG SCell configuration may include configuration for SCell(s) in MCG. The
SCG SCell configuration may be called SCG lower layer configuration. The SCG SCell configuration may include configuration for PSCell and/or SCell(s).

In step S1004, the MN in the network may send message to the SN to suspend SCG configuration if PSCell associated to the SN is included in the SCell configuration.

In step S1006, the UE and the SN may keep SCell configuration (e.g. MCG SCell configuration and/or SCG SCell configuration).

In step S1008, the UE may enter into RRC inactive mode upon receiving the RRC connection release message with suspend configuration.

In step S1010, upon receiving measIdleConfig and validity criteria for SCell(s) in RRC release message, the UE start performing IDLE mode measurement and checking validity of SCell(s) with the validity criteria. Upon receiving the RRC release message with suspend configuration, the UE may store SCell configuration which the network configure to keep. The list of SCell(s) of which the UE check validity may be provided by the network via system information or dedicated signalling (e.g. RRC release message).

In step S1012, the UE may receive paging message from the network (MN) while in RRC inactive state.

In step S1014, the UE may detect that mobile originated (MO) or mobile terminated (MT) data or signaling is triggered.

In step S1016, the UE may perform RRC resume procedure due to triggering of MO/MT data or signaling.

In step S1016, the network may provide message including indication to resume the stored SCell configuration. The indication may indicate resume all SCell(s) in the stored SCG lower layer configuration or selectively some SCell(s) in the stored SCG lower layer configuration. For selectively resumption, the list of cell(s) to be resumed may be included in the message. The message may be RRC message (e.g. system information or dedicated signaling) or MAC CE.

In step S1020, if the UE is able to comply the message, the UE may check validity of SCell(s) associated to the stored SCell configuration based on validity criteria and identity valid SCell(s) and invalid SCell(s) among the SCell(s) associated to the stored SCell configuration. Otherwise, the UE perform the actions upon leaving RRC_CONNECTED or re-establishment procedure specified in 3GPP TS 36.331 or TS 38.331.

In step S1022, for invalid SCell(s), the UE may initiate procedure to inform the network the UE is able to comply message but not able to resume the SCell because the SCell is invalid. When performing the procedure, the UE may send message to the network where the message includes failure reason/cause (e.g. invalid SCell) and the list of invalid SCell(s) among SCell(s) associated to the stored SCell configuration. The message may also include the list of valid SCell(s).

The procedure can be new procedure or existing procedures. For example, the procedure can be either failure information procedure or SCG failure information. If the invalid SCell is PSCell, the SCG failure information may be used. Otherwise, failure information is used.

Also, existing failure cause/type may be reused.

For example, for SCG failure, existing failure causes/types such as synchReconfigFailure-SCG, randomAccessProblem, rlc-MaxNumRetx, scg-reconfigFailure may be used.

For re-using failure cause/type, the UE determines which cause among existing cause will be used for this failure due to invalid SCell. Interaction between RRC layer and lower layers can be made as follows:

For rlc-MaxNumRetx, RRC layer may request RLC layer to trigger rlc-MaxNumRetx event and provide the indication for it to RRC layer. Upon receiving it, RRC layer may perform corresponding procedure specified in TS 36.331 or TS 38.331.

For randomAccessProblem, RRC layer may request MAC layer to trigger randomAccessProblem event and provide the indication for it to RRC layer. Upon receiving it, RRC layer may perform corresponding procedure specified in TS 36.331 or TS 38.331.

For T310 expiry, RRC layer may request physical layer to trigger "out-of-sync" event and provide the indication for it to RRC layer. Upon receiving it, RRC layer may consider T310 is expired and may perform corresponding procedure specified in TS 36.331 or TS 38.331.

The MN may provide a resume message to the SN.

In step S1024, for valid SCell(s), the UE may perform procedure corresponding to reception of (re-)configuration (e.g. SCell addition or PSCell addition) and perform synchronization and RA procedure toward valid SCell(s) if necessary.

In step S1026, upon the message sent in step S1022, the network may determine new SCell(s) (e.g. new PSCell and/or SCell) and send message including new (re-)configuration for determined new SCell(s) to the UE. The MN in the network may send message to the SN to resume SCG configuration if identifying PSCell associated to the SN is valid and resumed in the UE.

In step S1028, the UE may perform RACH procedure toward valid SCell, if necessary.

In step S1030, upon the message, the UE may perform procedure corresponding to reception of (re-)configuration (e.g. SCell addition or PSCell addition) and may perform RA procedure toward valid SCell(s) if necessary.

According to embodiments of the present disclosure, a UE may perform fast failure reporting for invalid SCell(s) as soon as identifying invalid SCell(s) without waiting of existing failure triggering. Further, the network may perform fast cell setup for CA and DC configuration by reducing latency for failure reporting including update SCell information. That is, a fast cell setup may be achieved by excluding the invalid cells during the DC setup.

According to the prior art, upon receiving RRC resume message, the UE resumes all DRBs. However, UE cannot perform transmission via the DRB if the DRB is associated to invalid SCell(s). If the UE resumes radio bearer(s) associated to invalid SCell(s), the UE may perform synchronization or RA procedure or transmission however, it must be failed.

According to another embodiment of the present disclosure, an UE may perform IDLE mode measurement in RRC inactive mode or RRC IDLE mode. If the UE receives from the network a message including SCell configuration and/or indication to resume all or some SCell(s) in the stored SCell configuration and radio bearer configuration, and if the UE can comply the message but identify all or some SCell(s) in the SCell configuration or the stored SCell configuration is (or are) invalid, the UE may suspend radio bearer(s) associated to invalid SCell(s) or keep radio bearer(s) suspended if have already been suspended. Then, the UE may inform the network of the list of suspended radio bearer(s) and/or the reason that SCell(s) is invalid. Upon receiving the list of suspended radio bearer(s) and/or the reason that SCell(s) is invalid, the network may provide message including new SCell configuration and/or IE to resume SCell(s) in the stored SCell configuration. Additionally, the message may include indication/configuration to release or resume the suspended radio bearer(s).

Figure 11:
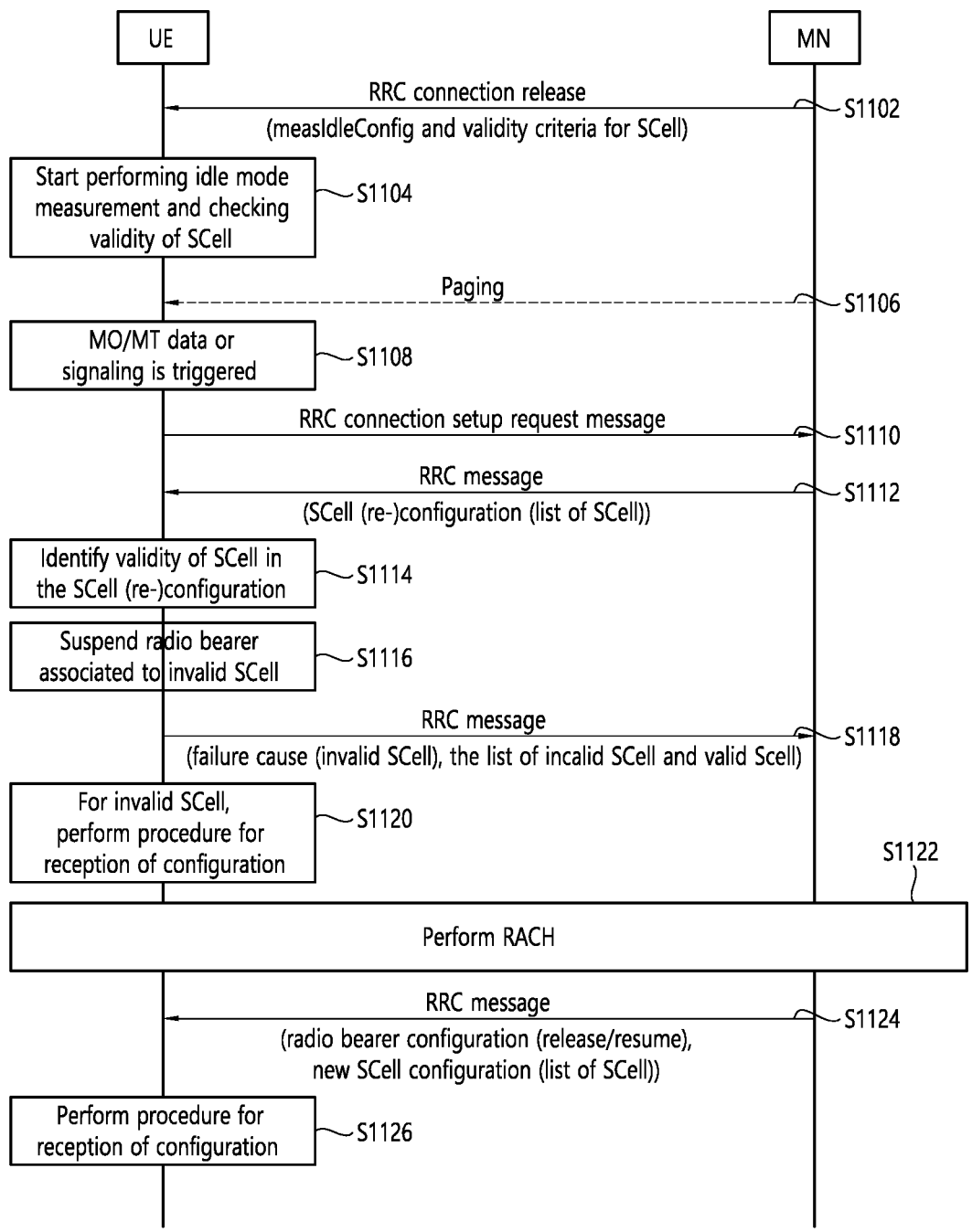
FIG. 11 shows a method for handling of radio bearer(s) associated to invalid SCell(s) according to an embodiment of the present disclosure.

FIG. 11 shows a method for handling of radio bearer(s) associated to invalid SCell(s) according to an embodiment of the present disclosure. In this embodiment, the UE may be in either RRC idle mode or RRC inactive mode. In this embodiment, a UE may be not only a terminal device, but also any types of device operating as wireless device, for example, an integrated access backhaul (IAB) node. Therefore, a UE may be referred as a wireless device. In this embodiment, a network may be at least one of base station (BS), gNodeB (gNB) or eNodeB (eNB). In this embodiment, it may be assumed that the UE supports dual connectivity with a master node (MN) and a secondary node (SN). The MN may be a MgNB or MeNB, and the SN may be a SgNB or SeNB.

In step S1102, the network may transmit configuration for idle state measurement (measIdleConfig) and validity criteria for SCell(s) to the UE. The validity criteria may be provided by the network via system information or dedicated signaling. The dedicated signaling may be a RRC release message. When the UE receives the RRC release message, the UE may enter into RRC inactive mode.

The valid cell may be a cell which satisfies a condition that RSRP or RSRQ of the cell is greater than certain threshold and/or that validity timer is running; and/or that the cell is belong to validity area; and/or that TA of the cell is valid.

In step S1104, upon receiving the RRC release message with measIdleConfig and validity criteria for SCell(s), the UE may start performing IDLE mode measurement and checking validity of SCell(s) with the validity criteria.

The list of SCell(s) of which the UE check validity may be provided by the network via system information or dedicated signaling (e.g. RRC release message).

In step S1106, the UE may receive paging message from the network.

In step S1108, the UE may detect that mobile originated (MO) or mobile terminated (MT) data or signaling is triggered.

In step S1110, the UE may perform RRC connection establishment procedure due to triggering of MO/MT data or signaling. In specific, the UE may transmit RRC connection setup message to the network.

In step S1112, the network may provide message including (re-)configuration for SCell(s). The (re-)configuration for SCell may include configuration for SCell and/or PSCell. The message may include radio bearer configuration (e.g. for SRB or DRB addition). The message may include RACH information. The RACH information may indicate whether the UE performs RACH procedure toward the determined PSCell and/or SCell. The RACH information may request RACH resource and/or configuration for the determined PSCell and/or SCell the list of valid cell which not belong to the determined PSCell and the list of determined SCell(s). The UE may perform RACH procedure toward the determined PSCell and/or SCell if TA of PSCell and/or SCell is not valid. The message may include UE identifier used in SN (e.g. RNTI).

In step S1114, if the UE is able to comply the message including the (re-)configuration for SCell(s), the UE may check validity of SCell(s) associated to the (re-)configuration for SCells(s) based on validity criteria and identifies valid SCell(s) and invalid SCell(s) among the SCell(s) associated to the (re-)configuration for SCells(s). Otherwise, the UE may perform the actions upon leaving RRC_CONNECTED or re-establishment procedure.

In step S1116, the UE may only perform radio bearer configuration for radio bearer(s) associated to valid SCell(s). The UE may not perform radio bearer configuration for radio bearer(s) associated to invalid SCell(s). That is, the UE may suspend radio bearer(s) associated to invalid SCell(s). The radio bearer(s) may be DRB or SRB.

In step S1118, the UE may send message to inform the network of the list of suspended radio bearer(s) and the reason to suspend (i.e. invalid SCell).

In step S1120, for valid SCell(s), the UE may perform procedure related to reception of (re-)configuration (e.g. SCell addition or PSCell addition).

In step S1122, the UE may perform synchronization and RA procedure toward valid SCell(s) if necessary. The UE may resume radio bearer(s) associated to valid SCell(s).

In step S1124, upon receiving the message, the network may determine new SCell(s) (e.g. new PSCell and/or SCell) and send message including new (re-)configuration for determined new SCell(s) to the UE. The message may include new radio bearer configuration to release or resume the suspended radio bearer(s).

In step S1126, upon receiving the message, the UE may perform procedure related to reception of (re-)configuration (e.g. SCell addition or PSCell addition) and may perform RA procedure toward valid SCell(s) if necessary.

According to embodiments of the present disclosure, a UE may perform efficient handling of radio bearer(s) associated to invalid SCell(s). In specific, fast cell setup may be achieved by excluding the invalid cells during the DC setup.

Further, according to embodiments of the present disclosure, it may be beneficial to prevent unnecessary triggering of procedure such as synchronization, Random access and transmission due to trial of transmission or reception via radio bearer(s) associated to invalid SCell(s).

Figure 12:
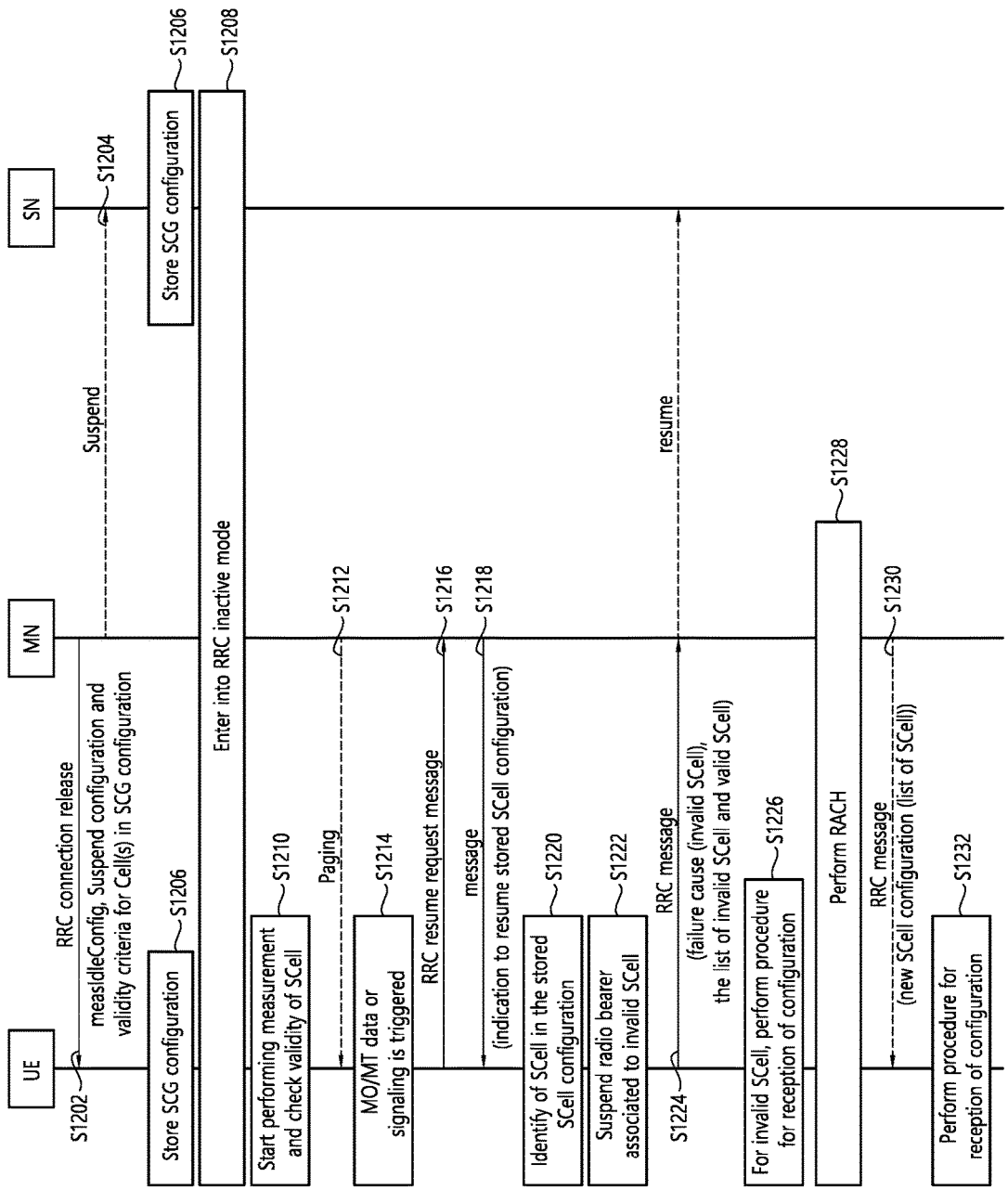
FIG. 12 shows a method for handling of radio bearer(s) associated to invalid SCell(s) according to an embodiment of the present disclosure.

FIG. 12 shows a method for handling of radio bearer(s) associated to invalid SCell(s) according to an embodiment of the present disclosure. In this embodiment, the UE may be in either RRC idle mode or RRC inactive mode. In this embodiment, a UE may be not only a terminal device, but also any types of device operating as wireless device, for example, an integrated access backhaul (IAB) node. Therefore, a UE may be referred as a wireless device. In this embodiment, a network may be at least one of base station (BS), gNodeB (gNB) or eNodeB (eNB). In this embodiment, it may be assumed that the UE supports dual connectivity with a master node (MN) and a secondary node (SN). The MN may be a MgNB or MeNB, and the SN may be a SgNB or SeNB.

In this embodiment, as a beginning condition, it may be assumed that a UE performed a mobility procedure. That is, the UE may perform handover procedure with the network, and may be handed over to the MN.

In step S1202, the MN may transmit a RRC connection release message to the UE with a suspend configuration. The RRC release message may include measIdleConfig and validity criteria for SCell(s). The validity criteria may be provided by the network via system information or dedicated signalling (e.g. RRC release message). The valid cell may be a cell satisfying the following information.

If RSRP or RSRQ of the cell is greater than certain threshold; and/or
If validity timer is running; and/or
If the cell is belong to validity area; and/or
If TA of the cell is valid The MCG SCell configuration may include configuration for SCell(s) in MCG. The SCG SCell configuration may be called SCG lower layer configuration. The SCG SCell configuration may include configuration for PSCell and/or SCell(s).

In step S1204, the MN in the network may send message to the SN to suspend SCG configuration if PSCell associated to the SN is included in the SCell configuration.

In step S1206, the UE and the SN may keep SCell configuration (e.g. MCG SCell configuration and/or SCG SCell configuration).

In step S1208, the UE may enter into RRC inactive mode upon receiving the RRC connection release message with suspend configuration.

In step S1210, upon receiving measIdleConfig and validity criteria for SCell(s) in RRC release message, the UE may start performing IDLE mode measurement and checking validity of SCell(s) with the validity criteria. The list of SCell(s) of which the UE check validity may be provided by the network via system information or dedicated signalling (e.g. RRC release message).

In step S1212, the UE may receive paging from the network, while staying in RRC inactive state.

In step S1214, the UE may detect that mobile originated (MO) or mobile terminated (MT) data or signaling is triggered.

In step S1216, the UE may perform RRC resume procedure due to triggering of MO/MT data or signaling.

In step S1218, the network may provide message including indication to resume the stored SCell configuration. The indication may be to resume all SCell(s) in the stored SCG lower layer configuration or selectively resume some SCell(s) in the stored SCG lower layer configuration. For selective resumption, the list of cell(s) to be resumed may be included in the message. The message may be RRC message (e.g. system information or dedicated signalling) or MAC CE.

In step S1220, if the UE is able to comply the message including the indication to resume the stored SCell configuration, the UE may check validity of SCell(s) associated to the stored SCell configuration based on validity criteria and identify valid SCell(s) and invalid SCell(s) among the SCell(s) associated to the stored SCell configuration. Otherwise, the UE may perform the actions upon leaving RRC_CONNECTED or re-establishment procedure.

In step S1222, the UE may only perform radio bearer configuration for radio bearer(s) associated to valid SCell(s) and may not perform radio bearer configuration for radio bearer(s) associated to invalid SCell(s). That is, the UE may suspend radio bearer(s) associated to invalid SCell(s). The radio bearer(s) may be DRB or SRB.

According to an example of the embodiment, if PSCell in the cell group configuration is invalid, the UE may suspend all radio bearer(s) associated to the cell group, or the UE may keep the radio bearer(s) suspended if the radio bearers have already been suspended.

If PSCell in the cell group configuration is valid but there is a radio bearer to which no SCell associated is invalid, the UE may suspend the radio bearer(s), or the UE may keep the radio bearer(s) suspended if the radio bearer have already been suspended.

In step S1224, the UE may send message to inform the network the list of suspended radio bearer(s) and the reason to suspend (i.e. invalid SCell).

In step S1226, for valid SCell(s), the UE may perform procedure related to reception of (re-)configuration (e.g. SCell addition or PSCell addition).

In step S1228, the UE may perform synchronization and RA procedure toward valid SCell(s) if necessary.

In step S1230, upon receiving the message, the network may determine new SCell(s) (e.g. new PSCell and/or SCell) and send message including new (re-)configuration for determined new SCell(s) to the UE. The message may include new radio bearer configuration to release or resume the suspended radio bearer(s). The MN in the network may send message to the SN to resume SCG configuration if identifying PSCell associated to the SN is valid and resumed in the UE.

In step S1232, upon receiving the message, the UE may perform procedure related to reception of (re-)configuration (e.g. SCell addition or PSCell addition) and may perform RA procedure toward valid SCell(s) if necessary.

According to embodiments of the present disclosure, a UE may perform efficient handling of radio bearer(s) associated to invalid SCell(s). In specific, fast cell setup may be achieved by excluding the invalid cells during the DC setup.

According to embodiments of the present disclosure, it may be beneficial to prevent unnecessary triggering of procedure such as synchronization, Random access and transmission due to trial of transmission or reception via radio bearer(s) associated to invalid SCell(s).

Figure 13:
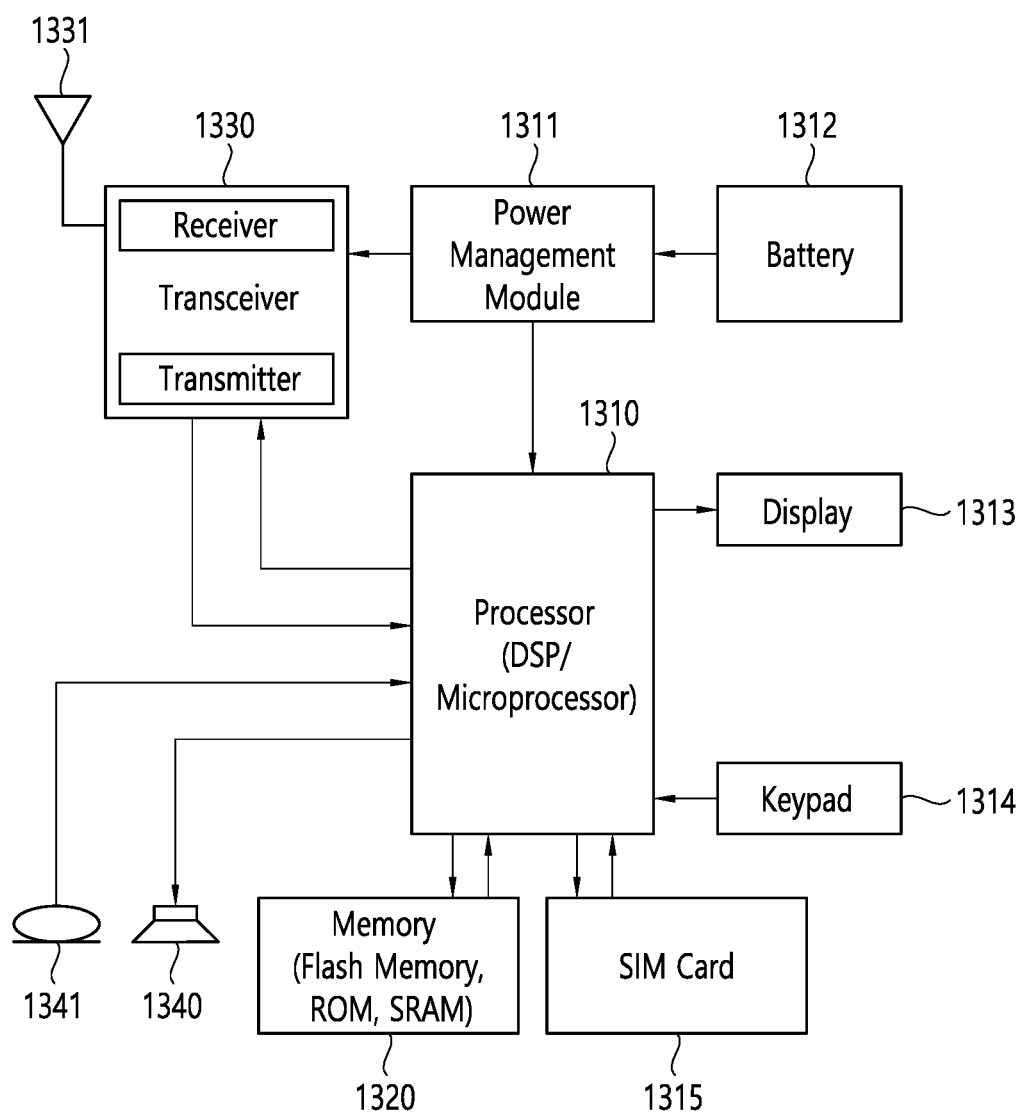
FIG. 13 shows more detailed wireless device to implement an embodiment of the present disclosure.

FIG. 13 shows more detailed wireless device to implement an embodiment of the present disclosure. The present disclosure described above for wireless device side may be applied to this embodiment.

A wireless device includes a processor 1310, a power management module 1311, a battery 1312, a display 1313, a keypad 1314, a subscriber identification module (SIM) card 1315, a memory 1320, a transceiver 1330, one or more antennas 1331, a speaker 1340, and a microphone 1341.

The processor 1310 may be configured to implement proposed functions, procedures and/or methods described in this description. Layers of the radio interface protocol may be implemented in the processor 1310. The processor 1310 may include ASIC, other chipset, logic circuit and/or data processing device. The processor 1310 may be an application processor (AP). The processor 1310 may include at least one of a digital signal processor (DSP), a central processing unit (CPU), a graphics processing unit (GPU), a modem (modulator and demodulator). An example of the processor 1310 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present disclosure, the processor 1310 may be configured to receive a cell group configuration including a list of cells. The cell group configuration may further include a measurement configuration for the measurement.

The processor 1310 may be configured to perform measurement on the cells. The measurement may be performed while the wireless device is in radio resource control (RRC) inactive state or a RRC idle state.

The processor 1310 may be configured to identify at least one invalid cell among the cells included in the cell group configuration based on at least one of a result of the measurement. The invalid cells may be identified based on a channel quality, a predefined validity area, timing advance (TA), or validity timer.

Further, the processor 1310 may be further configured to suspend a radio bearer which is related to the identified invalid cell. The suspending the radio bearer may be performed when all cells related to the radio bearer are invalid. In this case, the all cells related to the radio bearer may be a secondary cell (SCell). Meanwhile, the suspending the radio bearer may be performed when at least one cell related to the radio bearer is invalid. In this case, the at least one cell related to the radio bearer may be a primary secondary cell (PSCell)

The processor 1310 may be configured to report information on the identified invalid cell. The information on the identified invalid cell may include information of the suspended radio bearer.

According to embodiments of the present disclosure, a UE may perform fast failure reporting for invalid SCell(s) as soon as identifying invalid SCell(s) without waiting of existing failure triggering. Further, the network may perform fast cell setup for CA and DC configuration by reducing latency for failure reporting including update SCell information.

The power management module 1311 manages power for the processor 1310 and/or the transceiver 1330. The battery 1312 supplies power to the power management module 1311. The display 1313 outputs results processed by the processor 1310. The keypad 1314 receives inputs to be used by the processor 1310. The keypad 1314 may be shown on the display 1313. The SIM card 1315 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1320 is operatively coupled with the processor 1310 and stores a variety of information to operate the processor 1310. The memory 1320 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1320 and executed by the processor 1310. The memory 1320 can be implemented within the processor 1310 or external to the processor 1310 in which case those can be communicatively coupled to the processor 1310 via various means as is known in the art.

The transceiver 1330 is operatively coupled with the processor 1310, and transmits and/or receives a radio signal. The transceiver 1330 includes a transmitter and a receiver. The transceiver 1330 may include baseband circuitry to process radio frequency signals. The transceiver 1330 controls the one or more antennas 1331 to transmit and/or receive a radio signal.

The speaker 1340 outputs sound-related results processed by the processor 1310. The microphone 1341 receives sound-related inputs to be used by the processor 1310.

The embodiments of the disclosure may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 14:
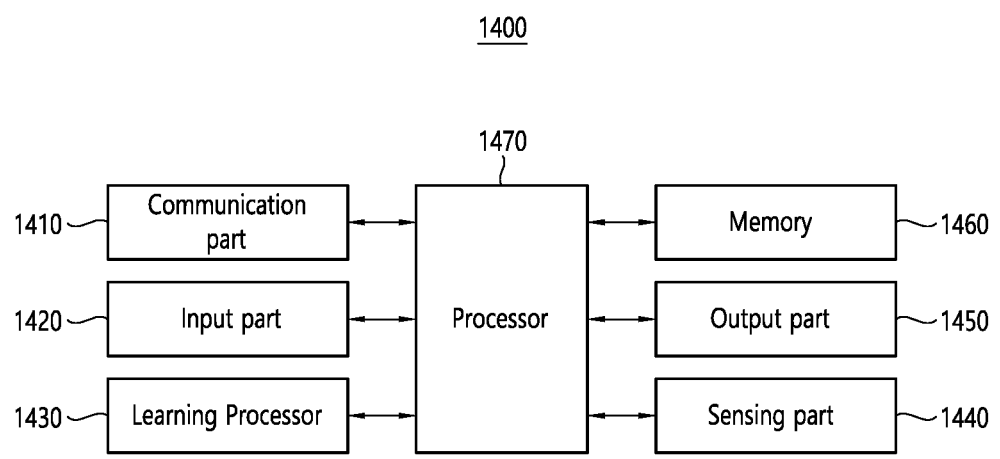
FIG. 14 shows an example of an AI device to which the technical features of the present disclosure can be applied.

FIG. 14 shows an example of an AI device to which the technical features of the disclosure can be applied.

The AI device 1400 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 14, the AI device 1400 may include a communication part 1410, an input part 1420, a learning processor 1430, a sensing part 1440, an output part 1450, a memory 1460, and a processor 1470.

The communication part 1410 can transmit and/or receive data to and/or from external devices such as the AI devices and the AI server using wire and/or wireless communication technology. For example, the communication part 1410 can transmit and/or receive sensor information, a user input, a learning model, and a control signal with external devices. The communication technology used by the communication part 1410 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1420 can acquire various kinds of data. The input part 1420 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1420 can acquire input data to be used when acquiring an output using learning data and a learning model for model learning. The input part 1420 may obtain raw input data, in which case the processor 1470 or the learning processor 1430 may extract input features by preprocessing the input data.

The learning processor 1430 may learn a model composed of an ANN using learning data. The learned ANN can be referred to as a learning model. The learning model can be used to infer result values for new input data rather than learning data, and the inferred values can be used as a basis for determining which actions to perform. The learning processor 1430 may perform AI processing together with the learning processor of the AI server. The learning processor 1430 may include a memory integrated and/or implemented in the AI device 1400. Alternatively, the learning processor 1430 may be implemented using the memory 1460, an external memory directly coupled to the AI device 1400, and/or a memory maintained in an external device.

The sensing part 1440 may acquire at least one of internal information of the AI device 1400, environment information of the AI device 1400, and/or the user information using various sensors. The sensors included in the sensing part 1440 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1450 may generate an output related to visual, auditory, tactile, etc. The output part 1450 may include a display unit for outputting visual information, a speaker for outputting auditory information, and/or a haptic module for outputting tactile information.

The memory 1460 may store data that supports various functions of the AI device 1400. For example, the memory 1460 may store input data acquired by the input part 1420, learning data, a learning model, a learning history, etc.

The processor 1470 may determine at least one executable operation of the AI device 1400 based on information determined and/or generated using a data analysis algorithm and/or a machine learning algorithm. The processor 1470 may then control the components of the AI device 1400 to perform the determined operation. The processor 1470 may request, retrieve, receive, and/or utilize data in the learning processor 1430 and/or the memory 1460, and may control the components of the AI device 1400 to execute the predicted operation and/or the operation determined to be desirable among the at least one executable operation. The processor 1470 may generate a control signal for controlling the external device, and may transmit the generated control signal to the external device, when the external device needs to be linked to perform the determined operation. The processor 1470 may obtain the intention information for the user input and determine the user's requirements based on the obtained intention information. The processor 1470 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1430 and/or learned by the learning processor of the AI server, and/or learned by their distributed processing. The processor 1470 may collect history information including the operation contents of the AI device 1400 and/or the user's feedback on the operation, etc. The processor 1470 may store the collected history information in the memory 1460 and/or the learning processor 1430, and/or transmit to an external device such as the AI server. The collected history information can be used to update the learning model. The processor 1470 may control at least some of the components of AI device 1400 to drive an application program stored in memory 1460. Furthermore, the processor 1470 may operate two or more of the components included in the AI device 1400 in combination with each other for driving the application program.

Figure 15:
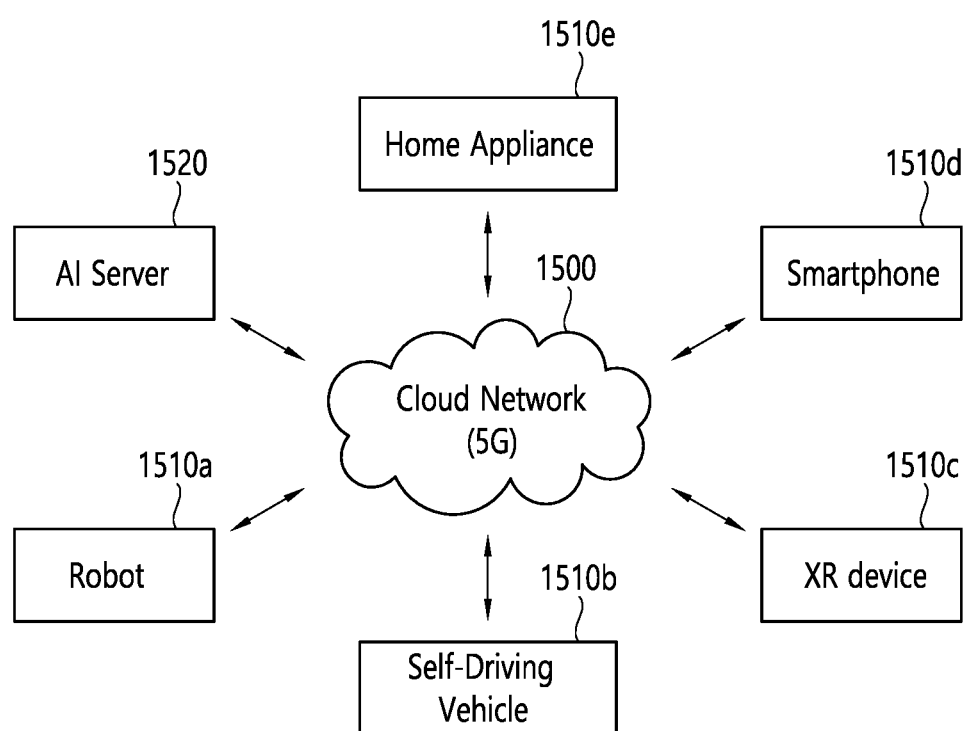
FIG. 15 shows an example of an AI system to which the technical features of the present disclosure can be applied.

FIG. 15 shows an example of an AI system to which the technical features of the present disclosure can be applied.

Referring to FIG. 15, in the AI system, at least one of an AI server 1520, a robot 1510a, an autonomous vehicle 1510b, an XR device 1510c, a smartphone 1510d and/or a home appliance 1510e is connected to a cloud network 1500. The robot 1510a, the autonomous vehicle 1510b, the XR device 1510c, the smartphone 1510d, and/or the home appliance 1510e to which the AI technology is applied may be referred to as AI devices 1510a to 1510e.

The cloud network 1500 may refer to a network that forms part of a cloud computing infrastructure and/or resides in a cloud computing infrastructure. The cloud network 1500 may be configured using a 3G network, a 4G or LTE network, and/or a 5G network. That is, each of the devices 1510a to 1510e and 1520 consisting the AI system may be connected to each other through the cloud network 1500. In particular, each of the devices 1510a to 1510e and 1520 may communicate with each other through a base station, but may directly communicate with each other without using a base station.

The AI server 1520 may include a server for performing AI processing and a server for performing operations on big data. The AI server 1520 is connected to at least one or more of AI devices constituting the AI system, i.e. the robot 1510a, the autonomous vehicle 1510b, the XR device 1510c, the smartphone 1510d and/or the home appliance 1510e through the cloud network 1500, and may assist at least some AI processing of the connected AI devices 1510a to 1510e. The AI server 1520 can learn the ANN according to the machine learning algorithm on behalf of the AI devices 1510a to 1510e, and can directly store the learning models and/or transmit them to the AI devices 1510a to 1510e. The AI server 1520 may receive the input data from the AI devices 1510a to 1510e, infer the result value with respect to the received input data using the learning model, generate a response and/or a control command based on the inferred result value, and transmit the generated data to the AI devices 1510a to 1510e. Alternatively, the AI devices 1510a to 1510e may directly infer a result value for the input data using a learning model, and generate a response and/or a control command based on the inferred result value.

Various embodiments of the AI devices 1510a to 1510e to which the technical features of the present disclosure can be applied will be described. The AI devices 1510a to 1510e shown in FIG. 15 can be seen as specific embodiments of the AI device 1400 shown in FIG. 14.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device adapted to operate in a wireless communication system, the method comprising:
   receiving a radio resource control (RRC) release message from a network,
   wherein the RRC release message includes a measurement configuration to be used by the wireless device while in an RRC idle state or an RRC inactive state, and
   wherein the RRC release message includes validity criteria for cells;
   entering the RRC idle state or the RRC inactive state based on the RRC release message;
   while in the RRC idle state or the RRC inactive state:
   (i) performing a measurement on the cells;
   (ii) checking validity of the cells based on the validity criteria for the cells;
   transmitting, to the network, a first message which transits the wireless device from the RRC idle state or the RRC inactive state to an RRC connected state;
   receiving, from the network, a second message including a configuration of the cells;
   identifying at least one invalid cell among the cells for which the configuration of the cells is not be able to apply based on the validity of the cells; and
   transmitting, to the network, a third message including information on the at least one invalid cell.

2. The method of claim 1, wherein the at least one invalid cell is identified based on a channel quality, a predefined validity area, a timing advance (TA), or a validity timer.

3. The method of claim 1, further comprising:
   suspending a radio bearer which is related to the at least one invalid cell.

4. The method of claim 3, wherein the information on the at least one invalid cell includes information of the suspended radio bearer.

5. The method of claim 3, wherein the suspending the radio bearer is performed when all cells related to the radio bearer are invalid.

6. The method of claim 5, wherein the all cells related to the radio bearer is a secondary cell (SCell).

7. The method of claim 3, wherein the suspending the radio bearer is performed when at least one cell related to the radio bearer is invalid.

8. The method of claim 7, wherein the at least one cell related to the radio bearer is a primary secondary cell (PSCell).

9. The method of claim 1, wherein the wireless device communicates with at least one of a mobile terminal, a network or autonomous vehicles other than the wireless device.

10. A wireless device adapted to operate in a wireless communication system, the wireless device comprising:
    a memory;
    a transceiver; and
    a processor, operably coupled to the memory and the transceiver, and configured to:
    control the transceiver to receive a radio resource control (RRC) release message from a network,
    wherein the RRC release message includes a measurement configuration to be used by the wireless device while in an RRC idle state or an RRC inactive state, and
    wherein the RRC release message includes validity criteria for cells;
    enter the RRC idle state or the RRC inactive state based on the RRC release message;
    while in the RRC idle state or the RRC inactive state:
    (i) perform a measurement on the cells based on the measurement configuration; and
    (ii) check validity of the cells based on the validity criteria for the cells;
    control the transceiver to transmit, to the network, a first message which transits the wireless device from the RRC idle state or the RRC inactive state to an RRC connected state;
    control the transceiver to receive, from the network, a second message including a configuration of the cells;
    identify at least one invalid cell among the cells for which the configuration of the cells is not be able to apply based on the validity of the cells; and
    control the transceiver to transmit, to the network, a third message including information on the at least one invalid cell.

11. The wireless device of claim 10, wherein the at least one invalid cell is identified based on a channel quality, a predefined validity area, a timing advance (TA), or a validity timer.

* * * * *